(12) United States Patent
Ishikawa

(10) Patent No.: US 6,509,929 B1
(45) Date of Patent: Jan. 21, 2003

(54) APPARATUS AND METHOD FOR CODING A MOVING PICTURE

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/559,269

(22) Filed: Apr. 27, 2000

(30) Foreign Application Priority Data

May 6, 1999 (JP) .......................................... 11-126249

(51) Int. Cl.[7] .............................................. H04N 7/18
(52) U.S. Cl. .............. 348/405; 375/240.03; 375/240.06
(58) Field of Search ........................ 375/240.01–240.07

(56) References Cited

FOREIGN PATENT DOCUMENTS

| | | |
|---|---|---|
| EP | 0 490 539 | 6/1992 |
| EP | 0 838 955 | 4/1998 |
| GB | 2 238 444 | 5/1991 |
| GB | 2 306 833 | 5/1997 |
| GB | 2 337 392 | 11/1999 |
| JP | 4-220875 | 8/1992 |
| JP | 4-343578 | 11/1992 |
| JP | 5-7303 | 1/1993 |
| JP | 6-6783 | 1/1994 |
| JP | 6-284408 | 10/1994 |
| JP | 6-284409 | 10/1994 |
| JP | 8-46964 | 2/1996 |
| JP | 9-252477 | 9/1997 |
| JP | 10-108184 | 4/1998 |
| JP | 11-4442 | 1/1999 |
| JP | 244656 | 7/2002 |

OTHER PUBLICATIONS

Patent Abstracts of Japan, Image Processing Unit, Its Method And Serving Medium, Jul. 4, 2000.
Patent Abstracts of Japan, Method And Device For Controlling Code Volume, Apr. 22, 1997.

*Primary Examiner*—Andy Rao
(74) *Attorney, Agent, or Firm*—Whitham, Curtis & Christofferson, PC

(57) ABSTRACT

A moving picture coding apparatus is provided which is capable of controlling a bit rate of output codes so as not to exceed a target bit rate and reducing noises in a decoded image. The apparatus comprises: a converter 13 for converting prediction errors of a plurality of pixel data into frequency components on a block basis; a quantizer 14 for quantizing converted prediction errors with reference to a quantization table; a dequantizer 15 for dequantizing quantized prediction errors with reference to a quantization table; a coder 18 for coding the quantized prediction errors to generate codes; an output buffer 19 for buffering the codes; a buffer checker 20 for checking a code occupied ratio in the output buffer; a plurality of quantization tables; and a quantization table selector 21 for selecting on quantization table from the plurality of quantization tables in accordance with the code occupied ratio. The quantizer employs the selected on quantization table, and the dequantizer employs a quantization table determined for a group of pictures.

6 Claims, 7 Drawing Sheets

FIG.5

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

FIG.6

| 25 | 18 | 17 | 15 | 12 | 9 | 7 | 6 |
|----|----|----|----|----|---|---|---|
| 20 | 18 | 15 | 12 | 9  | 7 | 6 | 5 |
| 16 | 16 | 13 | 10 | 6  | 6 | 5 | 3 |
| 14 | 13 | 10 | 7  | 5  | 5 | 4 | 3 |
| 11 | 9  | 6  | 5  | 5  | 4 | 3 | 2 |
| 9  | 7  | 6  | 4  | 3  | 3 | 2 | 2 |
| 7  | 6  | 5  | 4  | 3  | 3 | 2 | 1 |
| 6  | 6  | 5  | 6  | 2  | 2 | 0 | 0 |

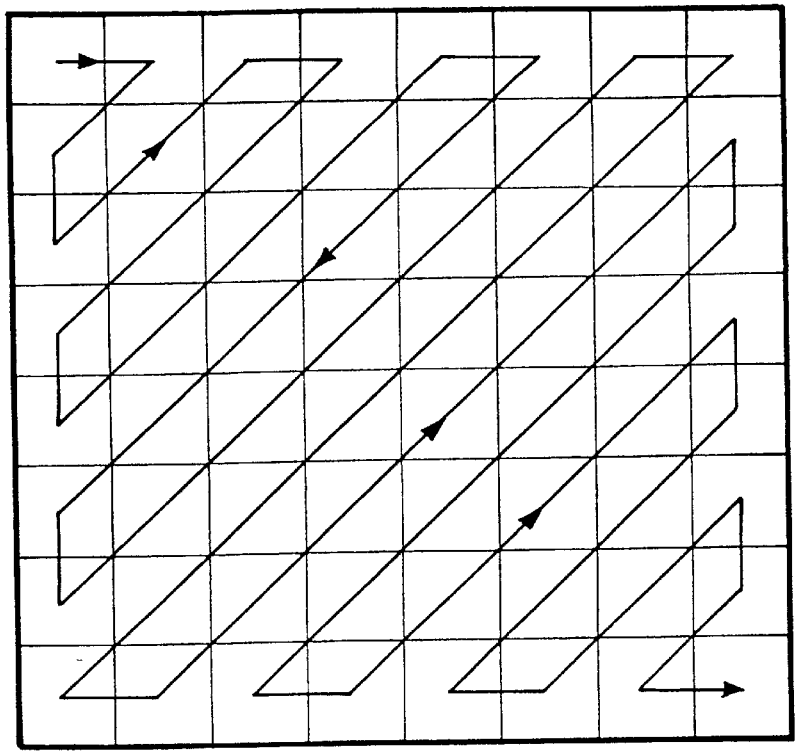

FIG. 9

| 8 | 6 | 5 | 4 | 4 | 3 | 2 | 2 |
|---|---|---|---|---|---|---|---|
| 6 | 5 | 5 | 4 | 3 | 2 | 2 | 1 |
| 5 | 5 | 4 | 3 | 2 | 2 | 1 | 0 |
| 4 | 4 | 3 | 2 | 1 | 1 | 1 | 0 |
| 3 | 3 | 2 | 1 | 1 | 1 | 0 | 0 |
| 3 | 2 | 2 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |

FIG. 10

| 8 | 6 | 5 | 4 | 4 | 3 | 2 | 2 |
|---|---|---|---|---|---|---|---|
| 6 | 5 | 5 | 4 | 3 | 2 | 2 | 1 |
| 5 | 5 | 4 | 3 | 2 | 2 | 1 | 1 |
| 4 | 4 | 3 | 2 | 1 | 1 | 1 | 1 |
| 3 | 3 | 2 | 1 | 1 | 1 | 1 | 0 |
| 3 | 2 | 2 | 1 | 1 | 1 | 0 | 0 |
| 2 | 2 | 1 | 1 | 1 | 1 | 0 | 0 |
| 2 | 2 | 1 | 2 | 0 | 0 | 0 | 0 |

APPARATUS AND METHOD FOR CODING A MOVING PICTURE

BACKGROUND OF THE INVENTION

1. Field of the Invention

The present invention relates to an apparatus and method for coding a moving picture and more particularly, to an apparatus and method of coding a moving picture in interframe mode.

2. Description of the Prior Art

When a moving picture coding apparatus compresses a moving picture, it is required to control the quantity of generated codes in order to prevent an overflow or underflow from occurring in a buffer of the moving picture decoding apparatus. The underflow can be easily avoided by stuffing dummy data when the quantity of generated codes decreases. On the other hand, the overflow can be suppressed generally by using, for example, a method that performs re-compression with a rough quantization or a method that forcefully changing data of non-zero, which was to be coded, to data of zero when the quantity of generated codes increases.

JP 09-252477A discloses an apparatus which rearranges the data of a plurality of macroblocks in a order frequency before coding the data. When the quantity of codes reaches a predetermined value, the apparatus replaces the remaining frequency components to zero.

JP 06-06783A discloses a technology for splitting frequency converted data into a plurality of frequency bands and weighting them to cut off high frequency components when an overflow is apt to occur.

However, the above recompression has a disadvantage that a processing time is increased and the above forceful discontinuation of coding conspicuously degrades image quality.

In the technology disclosed in JP 09-252477A a single upper limit frequency is applied to plural macroblocks. Therefore, the more high frequency components a block has, the more frequency components to be cut there are. This causes block distortion disadvantageously.

In the technology disclosed in JP 06-006783A, if there is an isolated high-frequency component having a large value it is weighted with a low value. Therefore, the isolated high frequency component changes to zero even if the component is important. This may often cause a noise in a picture.

JP 06-284409A, JP 06-284408A and JP 04-343578A also disclose the similar technologies in respect to cutting off components in high frequency regions notwithstanding the values of the components.

SUMMARY OF THE INVENTION

The present invention has an object to provide a moving picture coding apparatus and method capable of compressing moving pictures so that a bit rate of output codes never exceeds a target bit rate and so that noises in a decoded image such as a block distortion can be reduced.

According to a first aspect of the present invention, there is provided a moving picture coding apparatus for predictively coding moving picture data, comprising: a means for converting prediction errors of a plurality of pixel data into frequency components on a block basis; a quantizer for quantizing the converted prediction errors with reference to a quantization table; a dequantizer for dequantizing the quantized prediction errors with reference to another quantization table; a coder for coding the quantized prediction errors to generate codes; an output buffer for buffering the codes; a buffer check means for checking a code occupied ratio in the output buffer; a plurality of quantization tables; and a quantization table selecting means for selecting one quantization table from the plurality of quantization tables in accordance with the code occupied ratio, wherein the dequantizer employs a quantization table determined for the group of pictures.

The quantization table selecting means may perform selecting one quantization table on a macroblock basis.

According to a second aspect of the present invention, there is provided a moving picture coding method of predictively coding moving picture data, comprising the steps of: convering prediction errors of a plurality of pixel data into frequency components on a block basis; quantizing the converted prediction errors with references to a quantization table; dequantizing the quantized prediction errors with reference to another quantization table; coding the quantized prediction errors to generate codes; buffering the codes at an output buffer; checking a code occupied ratio in the output buffer; and selecting one quantization table from a plurality of quantization tables in accordance with the code occupied ratio, wherein the selected one quantization table is employed for quantization in the step of quantizing, and wherein a quantization table determined for a group of pictures is employed for dequantization in the step of dequantizing.

The step of selecting may be performed on a macroblock basis.

According to a third aspect of the present invention, there is provided a recordable medium on which a computer program is recorded, the computer program comprising instructions for causing a computer to execute a moving picture coding method for predictively coding moving picture data, the method comprising the steps of: converting prediction errors of a plurality of pixel data into frequency components on a block basis; quantizing the converted prediction errors with reference to a quantization table; dequantizing the quantized prediction errors with reference to another quantization table; coding the quantized prediction errors to generate codes; buffering the codes at an output buffer; checking a code-occupied ratio in the output buffer; and selecting one quantization table from a plurality of quantization tables in accordance with the code occupied ratio, wherein the selected one quantization table is employed for quantization in the step of quantizing, and a quantization table determined for a group of pictures is employed for dequantization in the step of dequantizing.

The step of selecting may be performed on a macroblock basis.

BRIEF DESCRIPTION OF THE DRAWINGS

The present invention will be more fully understood from the following detailed description with reference to the accompanying drawings in which:

FIG. 5 is a diagram showing an example of a quantization table;

FIG. 6 is a diagram showing a distribution of frequency components obtained by quantizing the frequency components of FIG. 4 using the quantization table shown in FIG. 5 with a quantization step size of 10;

FIG. 7 is a diagram showing an order of a zigzag scan for frequency components;

FIG. 8 is a diagram showing an example of quantization tables for roughly quantizing high frequency components according to the embodiment of the present invention;

FIG. 9 is a diagram showing a distribution of frequency components obtained by quantizing the frequency components of FIG. 4 using the quantization table shown in FIG. 8 with a quantization step size of 31; and FIG. 10 is a diagram showing a distribution of frequency components obtained by quantizing the frequency components of FIG. 4 using the quantization table shown in FIG. 5 with a quantization step size of 31.

DETAILED DESCRIPTION OF THE PREFERRED EMBODIMENTS

Figure 1:
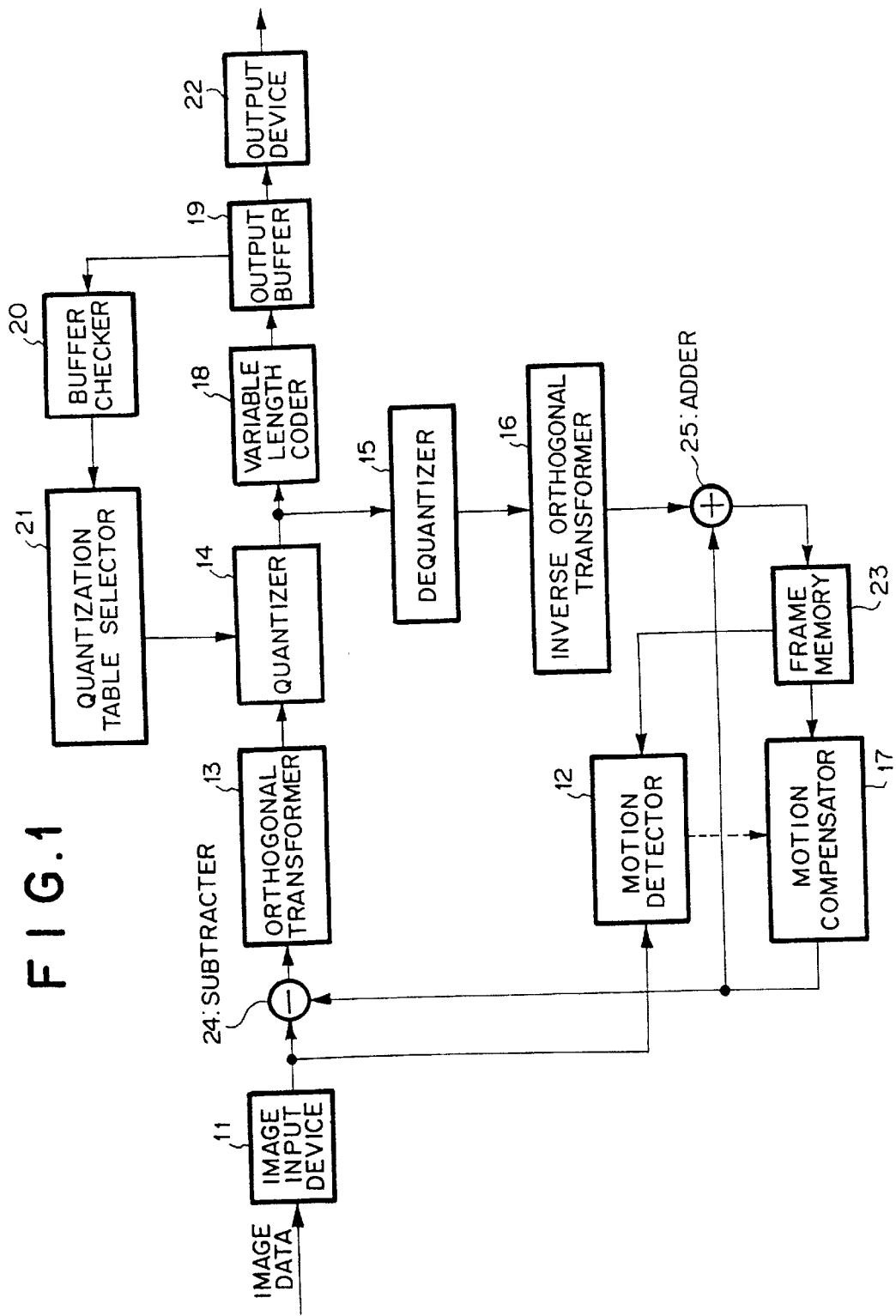
FIG. 1 is a block diagram showing a structure of a moving picture coding apparatus according to an embodiment of the present invention.

As shown in FIG. 1, a buffer checker 20 calculates a current buffer occupancy rate, based on both the capacity of an output buffer 19 and the quantity of generated codes. A quantization table selector 21 alters a quantization table for a quantizer 14 to another one in order to more roughly quantize high frequency components, based on the buffer occupancy rate. Thus the quantity of generated codes is reduced when an overflow is apt to occur. The quantizer 14 performs quantization using the altered quantization table. The altered quantization table is referred only from the quantizer 14. A dequantizer 15 performs dequantization using a quantization table before altered. Therefore, it is not required for a dequantizer at a decoding apparatus to alter a quantization table. Thus, even when a quantization step has already come to the maximum, an overflow of the output buffer 19 can be prevented by altering the quantization table within a frame along with checking the quantity of generated codes. In addition, noises are hardly caused because data is not altered extremely unlike the conventional technology that replaces high frequency components to zero.

Referring to FIG. 1, the moving picture coding apparatus according to the present invention comprises an image input device 11, motion detector 12, orthogonal transformer 13, quantizer 14, dequantizer 15, inverse orthogonal transformer 16, motion compensator 17, variable length coder 18, output buffer 19, buffer checker 20, quantization table selector 21, output device 22, frame memory 23, subtracter 24 and adder 25.

Each of the members in the moving picture coding apparatus respectively operates as follows: The impage input device 11 inputs each frame of a moving picture from a camera or the like. The motion detector 12 obtains correlation values of a current block in a current fram fed from the image input device 11 with several blocks, which are selected from all the blocks in a reference frame fed from the frame memory 23 and are located in the vicinity of the position of the current block in the current frame. On the basis of these correlation values, the motion detector 12 calculates a motion vector of the current block in the current frame. The motion vector corresponds to the maximum correlation value. The motion compensator 17 outputs to the subtracter 24 a block which is in the reference frame and is at a position apart by a length of the motion vector from the position of the current block in the current frame. The subtracter 24 calculates a difference block between the current block in the current frame and the block fed from the motion compensator 17 and feeds the difference block to the orthogonal transformer 13. The orthogonal transformer 13 comprises a discrete cosine transformer, for example. The orthogonal transformer 13 transforms the difference block into frequency components with reference to both a designated quantization table and a quantization step as will be described later. The variable length coder 18 performs variable length coding on the quantized frequency components and outputs visible length codes to the output buffer 19.

On the basis of a state of the output buffer 19, the buffer checker 20 calculates a current code occupied ratio in the buffer and outputs the ratio to the quantization table selector 21.1 When the buffer has less unoccupied capacity, the quantization table selector 21 peforms a feedback control so that one quantization table for the quantizer 14 is switched to another for roughly quantizing high frequency components. The output device 22 outputs to a transmission line or storage device the variable length codes supplied from the output buffer 19.

Each of the members for producing a reference frame operates as follows: The dequantizer 15 dequantizes the quantized frequency components that are output from the quantizer 14. The inverse orthogonal transformer 16 performs an inverse orthogonal transformation of the dequantized frequency components and outputs the result to the adder 25. The adder 25 calculates a sum of the output from the inverse orthogonal transformer 16 and the output from the motion compensator 17, and outputs the sum to the frame memory 28 as data of the reference frame. The frame memory 23 delays the data of the reference frame by a time of about 1 to output the delayed data. The dequantizer 15, inverse orthogonal transformer 16, adder 25, frame memory 23 and motion compensator 17 constitute a local decoder.

Figure 2:
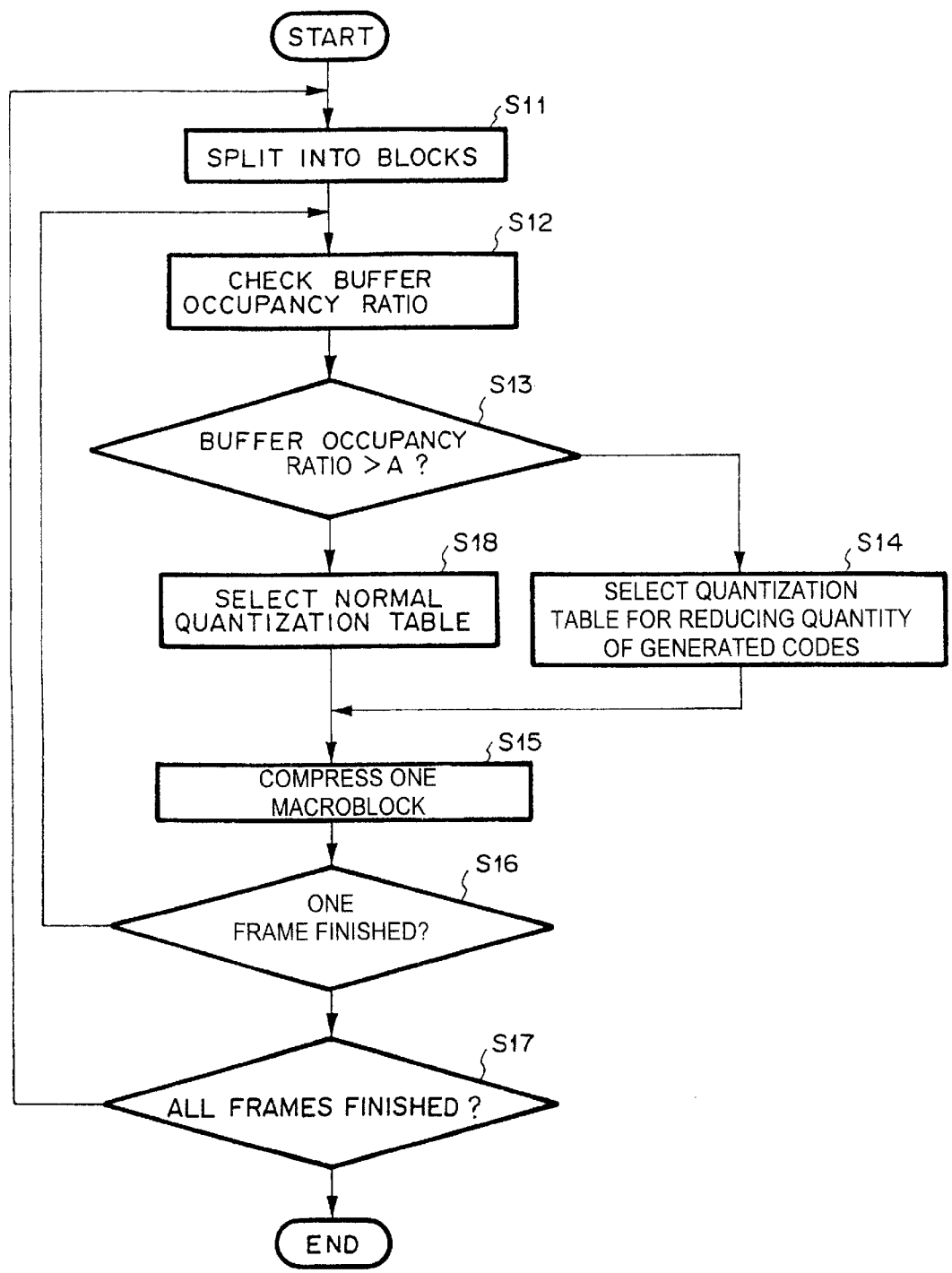
FIG. 2 is a flowchart showing an operation of the moving picture coding apparatus according to the embodiment of the present invention.

The whole operation of this embodiment will be detailed below with reference to the flowchart of FIG. 2.

When data of the current frame is supplied, the current frame is split into a plurality of rectangular blocks called as macroblocks (step S11). After every macroblock is compressed, the buffer checker 20 checks a current code occupied ratio in the buffer with a predetermined threshold A (step S13). If the code occupied ratio in the buffer is more than the threshold A, which means that an overflow is apt to occur, the quantization table selector 21 selects such a quantization table that reduces the quantity of generated code (step S14). If the code occupied ratio in the buffer is not more than the threshold A, the quantization table selector 21 selects a normal quantization table (step S18). Then, a process of compressing a macroblock is performed (step S15). This process is repeated until all the macroblocks in one frame have been compressed (step S16) and until all the frames have been compressed (step S17).

A plurality of quantization tables that reduce the quantity of generated codes may be prepared. In this case, the code occupied ratio in the buffer is compared with a plurality of thresholds at the step S13 in order to select one from the quantization tables in accordance with the maximum threshold among all the thresholds that are lower than the code occupied ratio in the buffer. Consequently, the quantity of generated codes can be controlled gradually so as to suppress an abrupt image variation.

Figure 3:
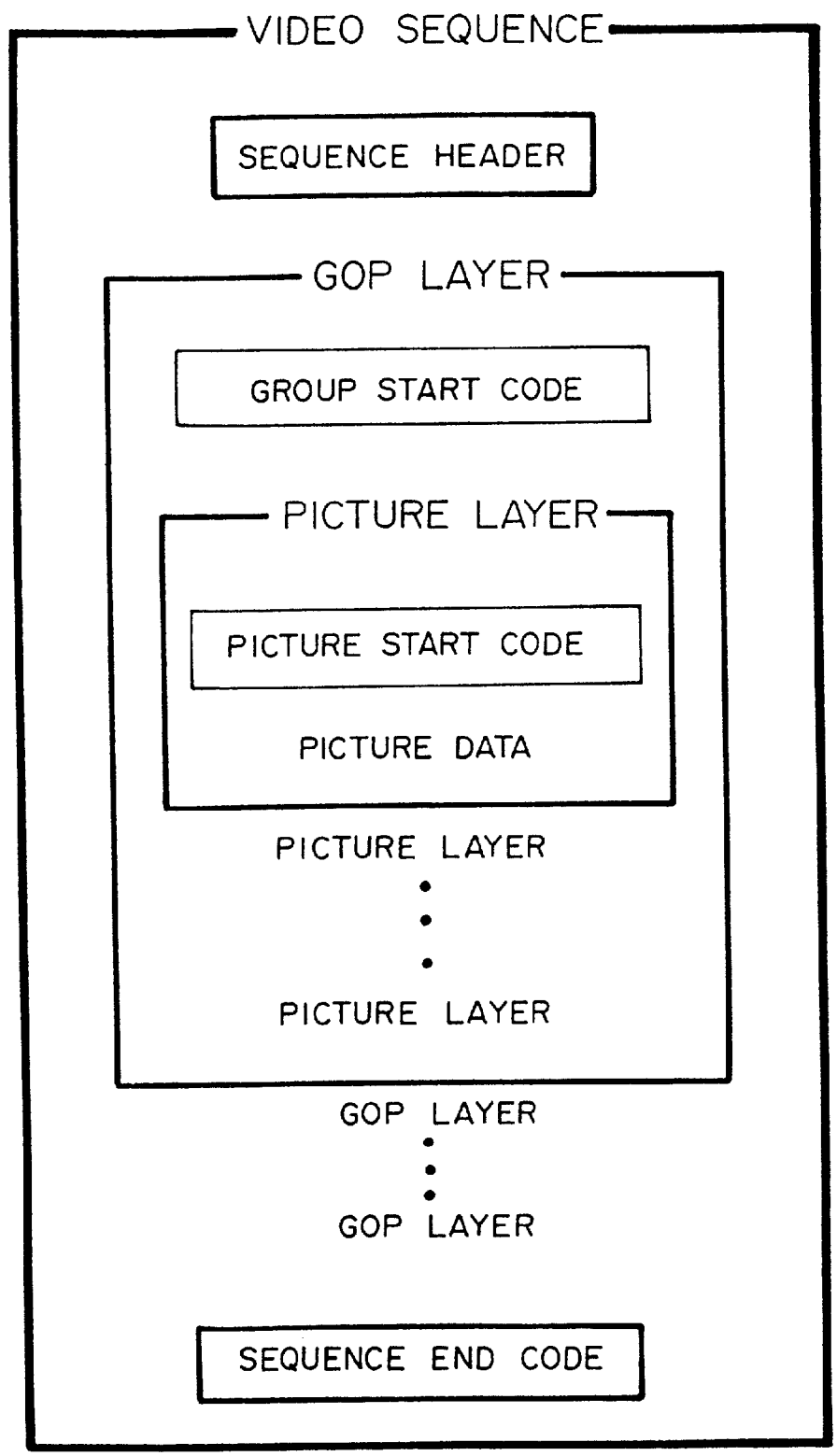
FIG. 3 is a diagram showing the format of a transmission signal in conformity with MPEG1.

As an example of a compression system, MPEG (Moving Picture Experts Group) 1 is particularly adopted which will be described with reference to FIG. 3. FIG. 3 shows a configuration of a video sequence of MPEG 1. Frames are classified as I-frame, P-frame, and B-frame. A code sequence of each frame starts with Picture Start Code followed by compressed codes of the picture. A group of frames between a certain I-frame and the frame just before the next I-frame is called a GOP (Group Of Pictures). Between a certain I-frame and the next I-frame, P-frame and B-frame are interposed at a constant period. A Group Start Code is added to the top of the GOP. A Sequence Header can be added to the top of each GOP in order to define a quantization table. It is required to describe a new table in the Sequence Header in order to alter a quantization table. In this way, it is possible to alter the quantization table for each GOP.

Figure 4:
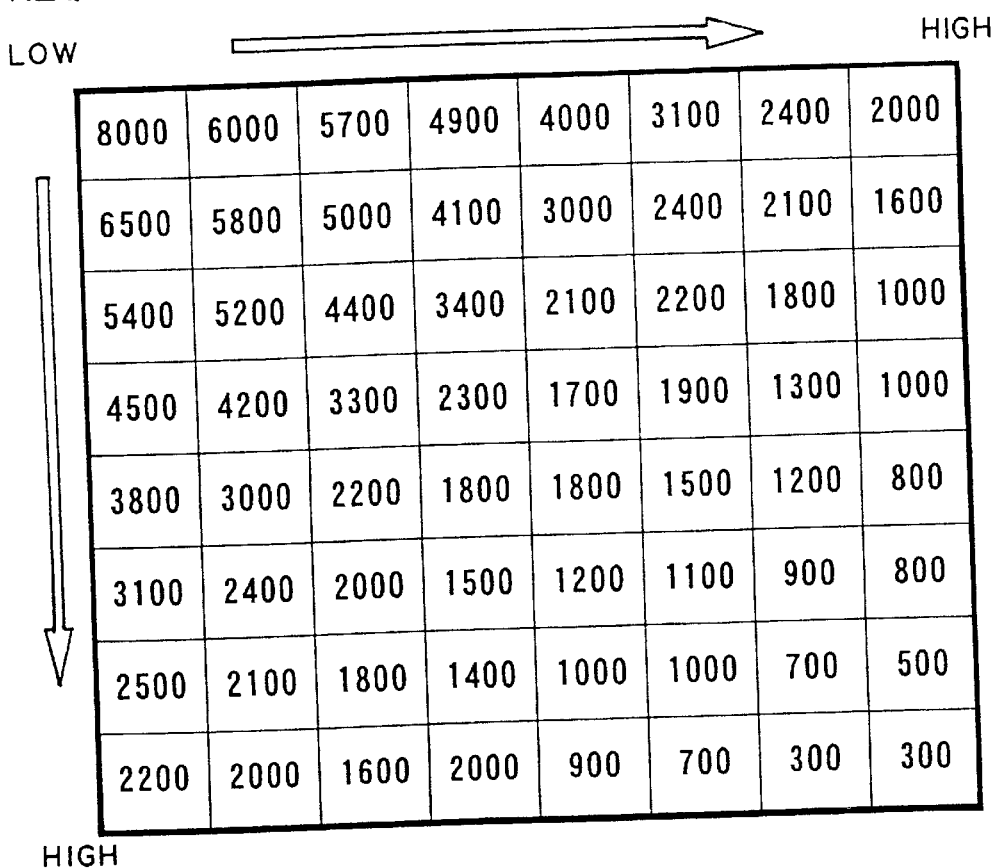
FIG. 4 is a diagram showing a distribution of frequency components in a block of 8×8 pixels which has been orthogonally transformed.

Frequency components of a block of 8×8 pixels orthogonally transformed at the orthogonal transformer 13 in FIG. 1 exhibit, for example, the frequency distribution as shown in FIG. 4. These frequency components are quantized using both a quantization step size and a quantization table. The quantization step size varies within a range from 1 to 31. The quantization table is such a table that consists of a matrix of 8×8, and an example of which is shown in FIG. 5. The quantization process at the quantizer 14 is performed by dividing the value of each frequency component by the product of the double value of the quantization step size and the value for each frequency in the quantization table. By way of example, quantizing the value in the upper left corner shown in FIG. 4 with a quantization step size of 10 yields a quantized result of 8000/(10×2×16)=25. By performing this process over all 64 frequency components a result is obtained as shown in FIG. 6. This result is subjected to the variable length coder 18 for variable length coding it in zigzag order shown in FIG. 7. In the variable length coding, to a combination of run length of zeros and the subsequent non-zero coefficient, a variable length corresponding to a generation frequency of the combination is assigned.

If the code occupied ratio in the buffer exceeds the predetermined threshold A (for example, 80% of the buffer capacity) during the compression process, the quantity of generated codes must be suppressed because the output buffers 19 is apt to overflow. In order to perform a further rough quantization when the current quantization step is at the maximum value of 31, there is nothing but a method of altering the quantization table. Then, by use of a quantization table that eliminates a lot of high frequency components, which are hardly recognized as noises to human eyes, the quantity of generated code can be suppressed and the overflow can be avoided.

FIG. 8 shows an example of a quantization table for roughly quantizing high frequency components. The use of this table for quantizing the frequency components of FIG. 4 at the quantization step size of 31 creates the result shown in FIG. 9. For reference purposes, FIG. 10 shows a result obtained by quantizing them at the quantization step size of 31 without altering the table. It is apparent from comparison between FIGS. 9 and 10 that the alteration of the quantization table can suppress the quantity of generated codes relative to that of the table before altered. This is because the run length of zeros increases and the position of the last non-zero coefficient in the zigzag scan moves up.

The dequantizer 15 dequantizes the quantized frequency components using the table determined for the GOP before altered. Therefore, an image decoding apparatus also can perform dequantization using the table determined for a GOP before altered and it is not required to write a quantization table on a macroblock basis in the Sequence Header.

The method, which is executed by the members in the moving picture coding apparatus according to the above embodiment, may also be realized by using a storage medium such as a CD-ROM that stores a program containing instructions to cause a computer to execute the method. From the storage medium, the computer reads the program and executes it.

The moving picture coding apparatus according to the above embodiment may also be realized by using a storage medium such as a CD-ROM that stores a program containing instructions to cause computer to function as each member in the apparatus. From the storage medium, the computer reads the program and executes it.

In the computer, a CPU generally transfers the program from storage medium to its main memory with an operating system, then reads the program from the main memory, and executes it.

The above program may be created from a text file that includes interpretive commands described therein and an interpreter for reading the file and interpreting the commands into executable instructions.

As obvious from the above description, the following effects can be achieved in accordance with the present invention.

First, compression can be achieved without using an oveflow from an output buffer, because altering a quantization table suppresses the quantity of generated codes and enables a rough estimation.

Second, the quantity of generated codes is adjusted even when a quantization step can not be altered because altering the quantization table on a macroblock basis adjusts the quantity of generated codes.

Third, the compression can be achieved, hardly causing noises sensed by human eyes, because altering the quantization table gradually eliminates high frequency components that have less frequency distribution, and minimizes variations in the frequency distribution. Also because a Sequence Header is not written at the time of altering the quantization table, thus a code quantity necessary for writing the Sequence Header (1120 bits) can be assigned to image data.

Fourth, a quick compression can be achieved. Because the table can be dynamically altered on a macroblock basis even from the middle of GOP without writing the Sequence Header into the quantization table, thus it is not required to re-compress the past data on a GOP basis when the generated code quantity can not be suppressed.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A moving picture coding apparatus for predictively coding moving picture data, comprising:

a means for converting prediction errors of a plurality of pixel data into frequency components on a block basis;

a quantizer for quantizing the converted prediction errors with reference to a quantizer table;

a dequantizer for dequantizing the quantized prediction errors with reference to another quantization table;

a coder for coding the quantized prediction errors to generate codes;

an output buffer for buffering said codes;

a buffer check means for checking a code occupied ratio in said output buffer;

a plurality of quantization tables; and a quantization table selecting means for selecting one quantization table from said plurality of quantization tables in accordance with said code occupied ratio, wherein said quantizer employs said selected one quantization table, and wherein said dequantizer employs a quantization table determined for a group of pictures.

2. The moving picture coding apparatus according to claim 1, wherein said quantization table selecting means performs selecting one quantization table on a macroblock basis.

3. A moving picture coding method of predictively coding moving picture data, comprising the steps of:

converting prediction errors of a plurality of pixel data into frequency components on a block basis;

quantizing the converted prediction errors with reference to a quantization table;

dequantizing the quantized prediction errors with reference to another quantization table;

coding the quantized prediction error to generate codes;

buffering said codes at an output buffer;

checking a code occupied ratio in said output buffer; and selecting one quantization table from a plurality of quantization tables in accordance with said code occupied ratio, wherein said selected one quantization table is employed for quantization in the step of quantizing, and wherein a quantization table determined for a group of pictures is employed for dequantization in said step of dequantizing.

4. The moving picture coding method according to claim 3, wherein said step of selecting is performed on a macroblock basis.

5. A recordable medium on which a computer program is recorded, said computer program comprising instructions for causing a computer to execute a moving picture coding method for predictively coding moving picture data, said method comprising the steps of:

converting prediction errors of a plurality of pixel data into frequency components on a block basis;

quantizing the converted prediction errors with reference to a quantization table;

dequantizing the quantized prediction errors with reference to another quantization table;

coding the quantized prediction errors to generate codes;

buffering said codes at an output buffer;

checking a code occupied ratio in said output buffer; and selecting one quantization table from a plurality of quantization tables in accordance with said code occupied ratio wherein said selected one quantization table is employed for quantization in said step of quantizing, and a quantization table determined for a group of pictures is employed for dequantization in said step of dequantizing.

6. The recordable medium according to claim 5, wherein said step of selecting is performed on a macroblock basis.

* * * * *